May 23, 1961 W. STELZER 2,985,489
TRACTOR-TRAILER BRAKE SYSTEM
Filed May 7, 1958 2 Sheets-Sheet 2

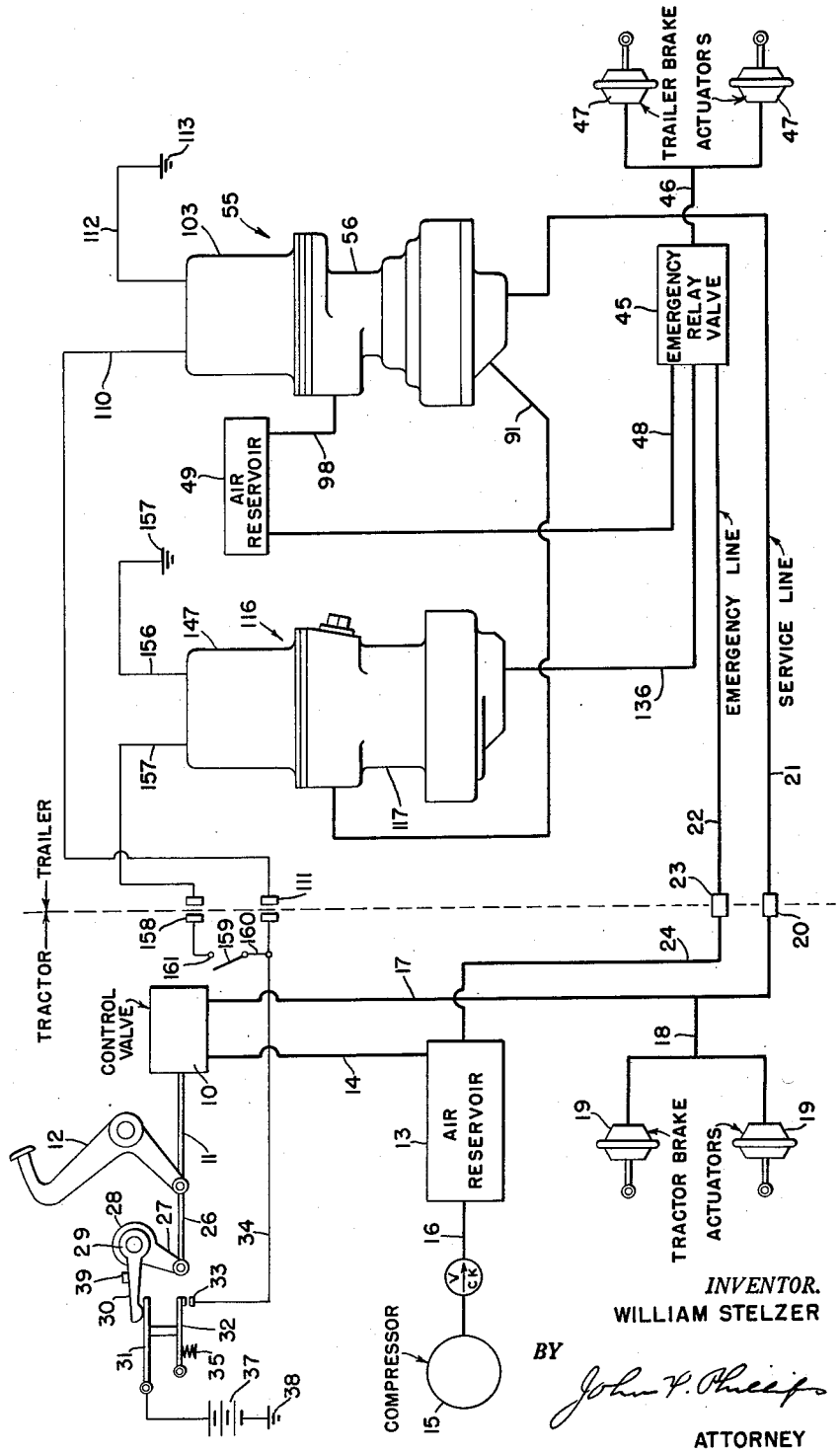

*INVENTOR.*
WILLIAM STELZER
BY John F. Phelps
ATTORNEY

United States Patent Office 2,985,489
Patented May 23, 1961

2,985,489

TRACTOR-TRAILER BRAKE SYSTEM

William Stelzer, Bloomfield Hills, Mich., assignor to Kelsey-Hayes Company, Detroit, Mich., a corporation of Delaware Filed May 7, 1958, Ser. No. 733,575

18 Claims. (Cl. 303—23)

This invention relates to a tractor-trailer brake system, and more particularly to such a system wherein super-atmospheric pressure is used for applying the tractor and trailer brakes.

In conventional tractor-trailer brake systems, it is the common practice to provide pedal controlled means for subjecting the tractor brakes to differential pressures to apply such brakes, and to extend a service line from the tractor brake control means to a relay valve mechanism on the trailer so that changes in pressures in the tractor brake actuators will be communicated to the relay valve mechanism to operate it and connect the trailer brake actuators to the source of pressure differential. It is well known that in such systems, the trailer brakes are applied to a degree proportional to the application of the tractor brakes. The differential pressures to which the trailer brake actuators are subjected must be sufficiently high to effect proper trailer brake actuation when the trailer is heavily loaded, and as a result, excessive trailer braking takes place when the trailer is running light or only partly loaded.

Moreover, it is also well known that an appreciable time lag occurs between the application of the tractor brakes and the application of the trailer brakes due to the interval of time necessary for pressure signals to occur in the relay valve through the service line. As a result, the trailer brakes are applied after the tractor brakes, thus introducing a serious operating condition which frequently causes "jackknifing." It is therefore the common practice to provide tractor-trailer combinations with a hand valve in the cab of the tractor through the operation of which the driver may snub the trailer brakes independently of the tractor brakes or anticipate the application of all of the brakes by operating the hand valve to apply the trailer brakes before depressing the brake pedal which controls the entire braking system. In my copending application Serial No. 726,666, filed April 7, 1958, now Patent No. 2,941,844, I have shown a novel type of electrically controlled auxiliary valve which is operative upon initial movement of the brake pedal from its normal off position to supply pressure to the relay valve to secure an immediate initial application of the trailer brakes before the brake pedal is depressed to the extent necessary to apply the tractor brakes, thus eliminating the necessity for the use of a hand valve and preventing the operation of the tractor brakes ahead of the trailer brakes.

An important object of the present invention is to provide a novel type of electrically operated valve interposed between the air reservoir and the relay valve on the tractor, by means of which different degrees of trailer brake application can be provided in accordance with the loading of the trailer.

A further object is to provide such a mechanism particularly adapted for use with super-atmospheric pressure tractor-trailer brake mechanisms wherein a normally inoperative valve mechanism is interposed in the service line ahead of the emergency relay valve so that the latter is subject to operation in accordance with the application of the tractor brakes when the trailer is relatively heavily loaded, and to provide novel means for operating the normally inoperative valve mechanism to render it effective for reducing the degree of application of the trailer brakes when the trailer is running unloaded or relatively lightly loaded.

A further object is to provide such a system wherein the normally inoperative valve mechanism referred to can be controlled by the driver to reduce the effective trailer braking when desired, and wherein such valve mechanism is automatically operative when so controlled to predetermine the maximum pressure supplied to the relay valve through the service line and thus predetermine the maximum degree of actuation of the trailer brake actuators.

A further object is to provide such a system wherein the normally inoperative valve mechanism referred to acts in combination with an automatic auxiliary valve mechanism which functions upon initial operation of the brake pedal to secure an immediate application of the trailer brakes, and wherein the normally inoperative valve mechanism is interposed in the service line between the auxiliary valve mechanism and the relay valve of the trailer so that, whereas the auxiliary valve mechanism always operates in the same manner, its effect on the relay valve is controlled by the normally inoperative valve mechanism to predetermine the degree of trailer brake actuation in accordance with the loading of the trailer.

Other objects and advantages of the invention will become apparent during the course of the following description.

In the drawings I have shown one embodiment of the invention. In this showing:

Figure 1 is a diagrammatic representation of the system as a whole;

Figure 2 is an enlarged axial sectional view through the normally inoperative valve mechanism which may be controlled in accordance with the loading of the trailer.

Figure 3:
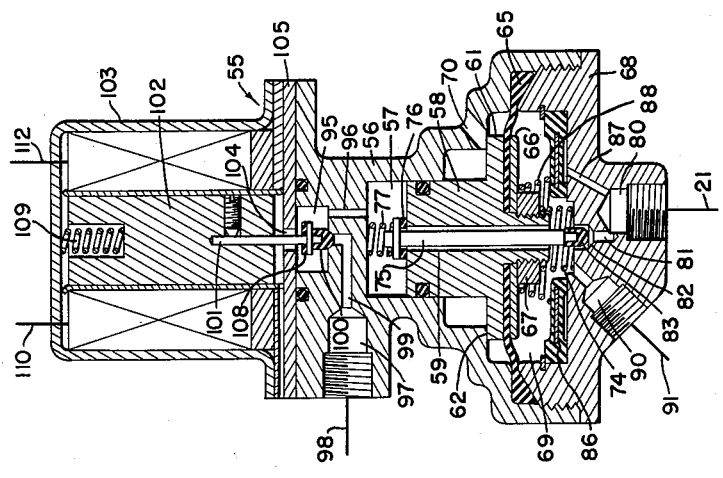
Figure 3 is a similar view of the auxiliary valve mechanism which functions to provide immediate trailer brake actuation upon initial movement of the brake pedal from its normal off position.
Figure 4:
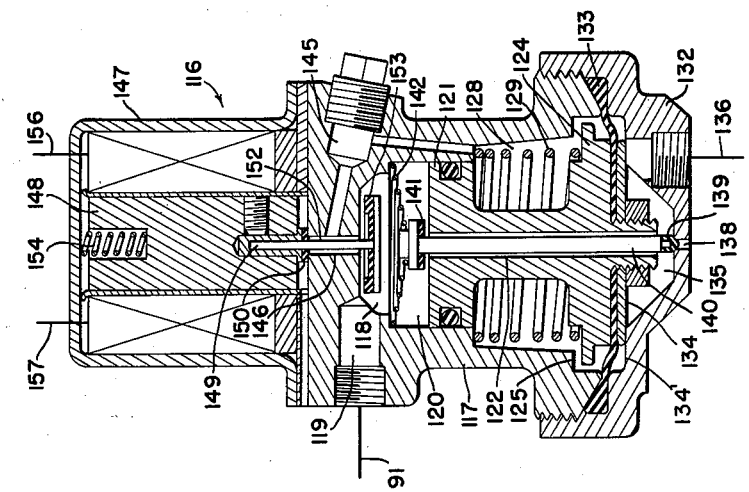

Figure 1 illustrates a tractor-trailer brake system of the super-atmospheric pressure type wherein a conventional control valve device 10 is connected as at 11 to the usual brake pedal 12 to be operated thereby and apply the tractor brakes. To this end, the control valve device is supplied with superatmospheric pressure from an air reservoir 13 through a line 14, compressed air being supplied to the reservoir from a compressor 15 through a suitable line 16. Operation of the control valve device 10 supplies super-atmospheric pressure through a line 17, branched as at 18 for connection with the tractor brake actuators 19 of conventional type. The line 17 extends rearwardly through a conventional connector 20 to supply fluid pressure through a service line 21 on the trailer. The usual emergency line 22 is also provided on the trailer and is connected as at 23 to a line 24 leading from the air reservoir 13.

The brake pedal 12 is connected as at 26 to an arm 27 carried by a disk 28 frictionally engaged by a second disk 29 having an operating arm 30 engageable with an arm 31 to close a normally open switch arm 32 to engage it with a contact 33 connected to one end of a line 34. The switch arm 32 is biased to open position by a spring 35. The arm 31 is connected to one terminal of a source 37 the other terminal of which is grounded as at 38. Depression of the brake pedal 12 closes the switch 32, and continued movement of the brake pedal beyond such point is permitted because of the frictional engagement of the disks 28 and 29. When the pedal is released, the arm 30 will be frictionally returned to normal position, at which point its movement is limited by a stop 39. This switch mechanism forms per se no part of the present invention and may be of the type shown in the patent to Jeannot G. Ingres, No. 2,571,885, issued October 16, 1951.

The trailer is provided with a conventional emergency relay valve 45, commonly known as a relay valve, and the emergency line 22 is connected to such valve. In accordance with conventional practice, a break in the line 22, connector 23, or line 24 will operate the relay valve 45 to apply the trailer brakes, as will become obvious. A line 46 is branched to supply fluid pressure to conventional trailer brake actuators 47 operative to apply the trailer brakes. A pressure line 48 communicates between the emergency relay valve 45 and air reservoir 49.

An auxiliary valve mechanism for effecting application of the trailer brakes promptly upon initial movement of the brake pedal from its normal off position is indicated as a whole by the numeral 55 and is shown in detail in Figure 3 of the drawings. The auxiliary valve mechanism comprises a preferably cast body 56 having a cylindrical bore 57 in which is axially movable a sealed plunger 58 provided with an axial passage 59 therethrough. The lower end of the plunger 58 has an outstanding flange 61 normally occupying the position shown in Figure 3 in engagement with a shoulder 62 formed in the body 56.

A diaphragm 65 is clamped to the bottom of the plunger 58 by a plate 66 maintained in position by a nut 67. The periphery of the diaphragm is clamped to the body 56 by a lower cap 68 threaded into the body 56. Such cap forms with the diaphragm and associated elements a chamber 69 in fixed communication with the lower end of the axial passage 59. The space above the diaphragm 65 and around the plunger 58 is vented to the atmosphere as at 70.

A spring 74 is interposed between the bottom wall of the cap 68 and the nut 67 to bias the plunger 58 to its upper normal position shown. A stem 75 extends loosely through the passage 59 and is provided at its upper end with a resilient valve 76 normally closing the upper end of the passage 59 from the chamber formed in the upper end of the cylinder 57. A spring 77 biases the valve 76 to closed position.

The bottom of the cap 68 is provided with a port 80 to which the service line 21 is connected. The port 80 communicates through a passage 81 and valve seat 82 with the chamber 69. The valve seat 82 is engageable by a resilient valve 83 adapted to be closed in a manner to be described to disconnect the chambers 69 and 80. The valve 83 is carried by the lower end of the stem 75.

A check valve 86 is arranged in the bottom of the chamber 69 and has its radially inner periphery seating against the bottom wall of the cap 68. Radially outwardly of such portion of the check valve, a passage 87 communicates with the port 80 so that the bottom of the check valve 86 is subject at all times to any pressure present in the service line 21. The check valve 86 may be in the form of a stiffened diaphragm and is biased to closed position by a spring 88.

A port 90 communicates at its upper end with the chamber 69 and has its lower end connected to one end of a line 91, the other end of which is connected to a manually controllable valve mechanism described in detail below. The auxiliary valve mechanism 55 forms per se no part of the present invention, except in combination with the manually controlled valve mechanism referred to, and is described and claimed in my copending application Serial No. 726,666, filed April 7, 1958, now U.S. Patent No. 2,941,844, referred to above. In such copending application, the line corresponding to the line 91 leads directly to the relay valve 45 to effect operation of the latter immediately upon initial operation of the brake pedal to activate the trailer brake actuators 47. In the present case, pressure signals through the line 91 are provided by operation of the valve mechanism 55, but the effect of such impulses on the emergency valve 45 is determined by the manually controllable valve described in detail below.

In the top of the body 56 is formed a chamber 95 communicating through a passage 96 with the chamber 57. The body 56 is provided with a port 97 connected by a line 98 to the air reservoir 49. The port 97 is adapted to communicate through a passage 99 with the chamber 95, but such communication is normally cut off by a resilient valve 100 carried by a stem 101. The stem 101 is connected to the armature 102 of a solenoid 103. The space below the armature 102 is open to the atmosphere and normally communicates with the chamber 95 through a port 104. Such port is formed in a closure plate 105 for the top of the chamber 95 and forms, around the port 104, a valve seat engageable by a normally open resilient valve 108 carried by the stem 101. The armature 102 is biased downwardly by a spring 109. One terminal of the solenoid 103 is connected by a wire 110 (Figure 1) through a detachable connector 111, with the wire 34. The other terminal of the solenoid is connected to a wire 112 grounded as at 113.

A manually controllable and normally inoperative valve mechanism indicated as a whole by the numeral 116 is connected between the valve mechanism 55 and the emergency valve 45. The valve mechanism 116 comprises a preferably diecast body 117 having in the upper portion thereof a chamber 118. This chamber communicates with a port 119 connected to the other end of the line 91 leading to the chamber 69 of the valve mechanism 55.

The chamber 118 is formed in part by the upper end of a cylindrical bore 120 in which is slidable a sealed plunger 121 having a passage 122 extending axially therethrough. The lower end of the plunger 121 is formed as an enlarged head 124 movable upwardly into engagement with a stop shoulder 125 formed in the body 117. The head 124 is normally in its lower position shown in Figure 2, spaced from the shoulder 125. The space between the upper and lower ends of the plunger 121 forms a chamber 128 in which is arranged a spring 129 which biases the plunger to its lower position shown in Figure 2.

A lower cap 132 is threaded on the body 117 and clamps in position therewith the peripheral portion of a diaphragm 133 fixed to the lower plunger head 124 by a plate 134 normally engaging a shoulder 134' to limit downward movement of the plunger 121.

Below the diaphragm 133, a chamber 135 is formed in the cap 132, and this chamber communicates with one end of a line 136 the other end of which (Figure 1) leads to the emergency relay valve. The chamber 135 is adapted to communicate with the atmosphere through a vent port 138 normally closed by a resilient valve 139 carried by a stem 140 projecting loosely through the axial passage 122. This stem is provided near its upper end with a resilient valve 141 normally disengaged from the upper end of the plunger 121 and adapted to be engaged therewith under conditions to be described to close communication through the passage 122. A spring 142 biases the stem 140 downwardly to normally maintain the valve 139 closed.

A passage 145 communicates at its lower end with the chamber 128 and at its upper end with a vertical passage 146 formed in the body 117 and normally communicating at its lower end with the chamber 118. A solenoid 147 is fixed above the body 117 and has an armature 148 carrying a hollow stem 149 provided at its lower end with a resilient valve 150 normally closing the upper end of the passage 146. The stem 149 carries a depending stem 152 the lower end of which is provided with a valve 153 normally opening the lower end of the passage 146 to the chamber 118 but movable upwardly upon energization of the solenoid 147 to close the lower end of such passage. The armature 148 is biased downwardly by a spring 154 to normally maintain the valve 150 closed and the valve 153 open.

One terminal of the solenoid 147 is connected to a wire 156 grounded as at 157 (Figure 1). The other terminal of the solenoid 147 is connected to the other end of the wire 157 which leads through a detachable connection 158 to a preferably manually operable switch 159. The switch 159 is connected by a wire 160 to the wire 34 previously described. The switch 159 is arranged in the open or heavy load position when the trailer is relatively heavily loaded. When the trailer is unloaded or relatively lightly loaded, the switch 159 is moved into engagement with a contact 161, under which conditions the impulses supplied from the auxiliary valve mechanism 55, through lines 91 and 136, to the relay valve 45 will be limited to prevent maximum activation of the trailer brake actuators 47.

*Operation*

It will be assumed that the trailer is relatively heavily loaded, in which case the switch 159 will be in the open or "high load" position shown in Figure 1. Under such conditions, the solenoid 147 (Figure 2) cannot be energized and the parts will all occupy the normal positions shown. Under such circumstances, pressure impulses applied to the pipe 91 by the valve 55, as described below, will render the emergency valve 45 initially subject solely to operation by the auxiliary valve mechanism 55. Pressure flowing through the line 91 will enter the chamber 118 (Figure 2), flow through the passage 122 into the chamber 135, and thence through line 136 to the emergency valve. The various passages, chambers and ports of the valve mechanism 116, therefore, will be connected in series with the lines 91 and 136, and the system will operate in accordance with the disclosure of my copending application referred to above.

Under such conditions, the operator, to apply the brakes, will depress the brake pedal 12 and initial movement of such pedal will close the switch 32 to energize the solenoid 103 (Figure 3). The armature 102 will move upwardly and the atmospheric port 104 will be closed by the valve 108. At the same time, the valve 100 will be opened. Accordingly, the chamber 57 will be disconnected from the atmosphere and will be connected through passage 99 and pipe 98 with the air reservoir 49. Fluid pressure in the chamber 57 will act on the upper end of the plunger 58 to move the latter downwardly, whereupon the spring 77 will seat the valve 83. The service line 21 thus will be disconnected from the chamber 69.

Slight further downward movement of the plunger 58 will move the upper end of such plunger out of engagement with the valve 76, and fluid pressure will flow from the chamber 57 through passage 59 into the chamber 69 and thence through pipe 91 and through the various chambers, passages and ports of the valve mechanism 116, as described above, and through line 136 to the emergency relay valve 45 to energize actuators 47.

It will be apparent that after initial movement of the brake pedal 12, operation of the control valve 10 will supply super-atmospheric pressure from line 14 through lines 17 and 18 to the tractor brake actuators 19 to start the application of the tractor brakes. Pressure also will flow through the service line 21. Due to the time lag necessary for pressure in the tractor brake actuators 19 to be reflected in the rear end of the service line 21, the above-described operation of the auxiliary valve mechanism 55 will take place before substantial pressure has been built up in the rear end of the service line 21. Thus any lag in the application of the trailer brakes is prevented, and these brakes will be applied simultaneously with or slightly before the application of the tractor brakes, thus preventing any "jackknifing" of the trailer with respect to the tractor.

As soon as pressure in the rear end of the line 21 exceeds the downward force exerted against the check valve 86 by pressure in the chamber 69 plus the loading of the spring 88, pressure will act on the bottom of the check valve 86 to move the inner periphery thereof upwardly for the flow of air pressure into the chamber 69. This increased pressure in the chamber 69, acting on the bottom of the diaphragm 65, will move the plunger 58 upwardly the slight distance necessary to close the valve 76, thus disconnecting the chambers 57 and 69 from each other. When the pressure in the chamber 69 increases to a predetermined point, such pressure will act upwardly on the diaphragm 65, whereupon the stem 75 will be elevated. Thus the valve 83 will be opened to directly connect the port 80 with the chamber 69, and pressure flowing out of the line 91 will be the pressure affecting the tractor brake actuators 19. Such pressure will be communicated to the relay valve 45 which functions in accordance with conventional practice. Thus the trailer brake actuators will be activated to an extent proportional to the activation of the tractor brake actuators 19.

If, while the brakes are still being applied, pressure in the chamber 69 should drop below a predetermined point, the plunger 58 will be moved downwardly by pressure in the chamber 57. The valve 83 will then close and the valve 76 will be cracked to supply pressure fluid from the chamber 57 to the chamber 69. Differential pressures in the chambers 57 and 69 thus prevent pressure in the chamber 69 from dropping below a predetermined point.

So long as the brake pedal is held depressed, the circuit through the solenoid 103 will be maintained and the foregoing operations of the auxiliary valve mechanism 55 will take place. When the brake pedal 12 is released, the switch 32 will be opened and the solenoid 103 will be de-energized. Under such conditions, the chamber 57 again will be connected to the atmosphere through passage 96, chamber 95 and port 104. Residual pressure in the chamber 69 will then promptly move the plunger 58 to its uppermost position. The control valve 10 having been returned to normal condition by the release of the brake pedal, there will be a pressure drop in the service line 21. The opening of the valve 83 incident to upward movement of the plunger 58 to the normal position will connect the line 91 to the line 21, thus relieving pressure from the line 91 to restore the relay valve 45 to normal condition and release the trailer brakes.

Assuming that the trailer is running light or relatively lightly loaded, the operator will close the switch 159. With the brake pedal released, no circuit will be completed through the solenoid 147 since the switch 32 will be open. However, immediately upon the depression of the brake pedal 12, the closing of the switch 32 will not only energize the solenoid 103 to cause the operation of the valve mechanism 55 in the manner described above, but will close a circuit through the solenoid 147. Under such conditions, the armature 148 will move upwardly to open the valve 150, and thus connect the chamber 128 to the atmosphere, and will close the valve 153. This valve will have been previously normally open to connect and balance pressures in the chambers 118 and 128. Now, however, the closing of the valve 153 will connect the chamber 118 solely to the line 91 leading to the auxiliary valve mechanism 55, previously described. Therefore, when pressure is supplied through line 91 by the operation of the valve mechanism 55, such pressure will flow through passage 122 into the chamber 135 to act against the bottom of the diaphragm 133 and move the plunger 121 upwardly. This operation closes the valve 141. The action of the spring 129 is to somewhat delay upward movement of the plunger 121 until adequate pressure has been built up in the chamber 135. As soon as the valve 141 is closed, no additional fluid pressure can flow into the chamber 135. The pressure supplied to the chamber 135 acts through the line 136 on the relay valve 45 to cause the normal functioning thereof to apply the trailer brakes. The relative pressures in the chambers 118 and 135 will depend upon the relative areas of the upper end of the plunger 121 and the area of the bottom of the diaphragm 133, which latter force is opposed to some extent by the spring 129. The several factors predetermining relative pressures in the chambers 120 and 135 can be as desired so that a lower pressure in the chamber 135 than in the chamber 118 will effect operation of the relay valve 45.

From the foregoing, it will be apparent that when the switch 159 is open, the valve 116 is inoperative for controlling pressures flowing between lines 91 and 136. When the switch 159 is closed, however, when the trailer is relatively lightly loaded or empty, the pressure in the line 136 will be lower to a predetermined extent than the pressure in the line 91, thus preventing the over-application of the trailer brakes under such conditions. The slight delaying of the closing of the valve 141 assures adequate immediate pressures in the chamber 135 to effect operation of the relay valve 45. Any tendency for pressure in the chamber 135 to increase above a predetermined point is prevented since such pressures will act upwardly on the diaphragm 133 to lift the stem 140 and thus crack the valve 139 to slightly vent the chamber 135 to the atmosphere and restore the desired pressure therein.

Thus it will be apparent that the valve 55 will always function, so far as its own parts are concerned, solely in accordance with the operation of the brake pedal. The results accomplished by the valve mechanism 55, however, are determined by the operativeness or inoperativeness of the valve mechanism 116. Whether the switch 159 is open or closed, therefore, the valve mechanism 55 functions to provide an immediate application of the trailer brakes upon initial movement of the brake pedal from its normal off position. The functioning of the valve mechanism 55 for controlling the relay valve 45, however, is determined in accordance with the functioning of the valve mechanism 116. Thus immediate full application of the trailer brakes, or immediate reduced application of the trailer brakes, will take place upon operation of the brake pedal, depending on whether the switch 155 is in the open or heavy load position or in the closed or light load position.

As previously stated, the valve mechanism 116 is preferably employed in combination with the valve mechanism 55 because of the advantageous results obtained, namely, both the quick initial setting of the trailer brakes and the limiting of the energization of the trailer brake actuators when the trailer is running light. It also will be noted that the valve mechanism 116, controllable in accordance with the trailer load, is capable of being used in a conventional system without the valve mechanism 55. In such case, the valve mechanism 55 and associated elements would be eliminated, and the service line 21 and pipe 91 are directly connected to each other.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a tractor-trailer brake system, brake actuators for the tractor brakes, manually operable control means on the tractor for supplying fluid pressure to said actuators, actuators for the trailer brakes, a relay valve on the trailer connected to said trailer brake actuators and operable for supplying fluid pressure to said trailer brake actuators from a source of pressure on the trailer, a service line connected at one end to said control means and at its other end to said relay valve to render the latter operable when pressure is present in said service line, and a valve mechanism connected in said service line and comprising a pressure responsive unit therein occupying a normal position and having a pressure surface of relatively small area subject to pressures in said one end of said service line and a relatively larger pressure area subject to pressures in said other end of said service line, a valve device having mechanical engagement with said pressure responsive unit and having a normal position opening communication between said ends of said service line, and selectively operable means connected to said control means for operation therewith for rendering pressure in said other end of said service line effective against said relatively larger pressure area for moving said pressure responsive unit from said normal position to close said valve device and limit the building-up of pressures in said other end of said service line.

2. A system according to claim 1 wherein said means for rendering pressure in said other end of said service line effective for moving said pressure responsive unit from said normal position comprises a valve device connected for operation with said control means and operable for rendering pressure in said other end of said service line effective against said larger area of said pressure responsive unit for moving the latter away from said normal position.

3. A system according to claim 1 wherein said means for rendering pressure in the other end of said service line effective for moving said pressure responsive unit from said normal position comprises an electromagnetic device, and a switch connected for operation by said control means for closing a circuit through said electromagnetic device.

4. In a tractor-trailer brake system, brake actuators for the tractor brakes, manually operable control means on the tractor for supplying fluid pressure to said actuators, actuators for the trailer brakes, a relay valve on the trailer connected to said trailer brake actuators and operable for supplying fluid pressure to said trailer brake actuators from a source of pressure on the trailer, a service line connected at one end to said control means and at its other end to said relay valve to render the latter operable when pressure is present in said service line, and a valve mechanism connected in said service line and comprising a body having a first chamber communicating with said one end of said service line and a second chamber communicating with said other end of said service line, a pressure responsive unit having a relatively small surface exposed to said first chamber and a relatively large surface exposed to said second chamber, a normally open valve device having mechanical engagement with said pressure responsive unit, said pressure responsive unit having a normal position in which said valve device provides communication between said chambers whereby pressure impulses in said one end of said service line will pass to said other end of such line to operate said relay valve, means biasing said pressure responsive unit to said normal position, said valve mechanism having a third chamber to which another surface of said pressure responsive unit is exposed to oppose pressure acting against said relatively large surface, passage means communicating between said first and third chambers, and valve means for closing said third chamber to said first chamber and opening said third chamber to the atmosphere whereby pressure acting against said larger surface will move said pressure responsive unit to close said valve device to limit the building-up of pressure in said other end of said service line.

5. A system according to claim 4 wherein said means for closing said third chamber to said first chamber and opening said third chamber to the atmosphere comprises a normally open valve element between said passage means and said first chamber and a normally closed valve element between said passage means and the atmosphere, and means for moving said valve elements to close said normally open valve element and open said normally closed valve element.

6. A system according to claim 5 wherein said means for moving said valve elements comprises an electromagnetic device connected to said valve elements, and a circuit for said electromagnetic device comprising a switch.

7. A system according to claim 5 wherein said means for moving said valve elements comprises an electromagnetic device connected to said valve elements, a brake pedal connected to said control means and having a normal off position, and a circuit for said electromagnetic device comprising a pair of switches in series, one of said switches being connected to said brake pedal to be closed upon initial movement thereof from its off position, the other of said switches being operable independently of said one switch.

8. In a tractor-trailer brake system, brake actuators for the tractor brakes, a brake pedal on the tractor having a normal off position, control means on the tractor connected to said brake pedal and operable for supplying fluid pressure to said actuators, actuators for the trailer brakes, a relay valve on the trailer connected to said trailer brake actuators and having a fluid conduit connected to a source of fluid pressure on the trailer, a service line connected at one end to said control means and at its other end to said relay valve whereby pressure in said service line will operate said relay valve to supply pressure fluid from said source to said trailer brake actuators, an auxiliary valve mechanism connected in said service line and comprising elements connected for operation by said brake pedal and operative upon initial movement of said brake pedal from off position for supplying pressure fluid from said source to said other end of said service line to operate said relay valve and comprising other elements connected to be responsive to pressure in said one end of said service line and operable when pressure in said one end of said service line increases to a predetermined point for closing communication between said source and said other end of said service line and opening communication through said service line, and a second valve mechanism connected in said service line and normally providing for the free flow of fluid through said service line, said second valve mechanism comprising controllable elements for reducing pressure supplied through said service line from said auxiliary valve mechanism to said relay valve.

9. A system according to claim 8 wherein said controllable elements of said second valve mechanism comprise normally inoperative pressure responsive means having areas exposed to pressures respectively in said ends of said service line and opening communication through said service line, and means for rendering said pressure responsive means responsive to pressure in said other end of said service line so as to become operative for relatively reducing pressures flowing from said auxiliary valve mechanism to said relay valve.

10. A system according to claim 8 wherein said controllable elements of said second valve mechanism comprise normally inoperative pressure responsive means having areas exposed to pressures respectively in said ends of said service line and opening communication through said service line, a chamber normally communicating with said one end of said service line, said pressure responsive means having a third area open to said chamber to oppose movement of said pressure responsive means by pressure in said other end of said service line, a valve device for normally maintaining said communication between said chamber and said one end of said service line, and means for operating said valve device for closing communication between said one end of said service line and said chamber and opening said chamber to the atmosphere for rendering said pressure responsive means operative for reducing pressures passing through said service line from said auxiliary valve mechanism to said relay valve.

11. A system according to claim 8 wherein said controllable elements of said second valve mechanism comprise normally inoperative pressure responsive means having areas exposed to pressures respectively in said ends of said service line and opening communication through said service line, a chamber normally communicating with said one end of said service line, said pressure responsive means having a third area open to said chamber to oppose movement of said pressure responsive means by pressure in said other end of said service line, a valve device for normally maintaining said communication between said chamber and said one end of said service line, an electromagnetic device connected to said valve device to operate it to close communication between said one end of said service line and said chamber and open said chamber to the atmosphere to render said pressure responsive means responsive to predetermined pressure in said other end of said service line to be moved by such pressure to prevent further flow of fluid through said service line, and a circuit for said electromagnetic device comprising a pair of switches in series, one such switch being connected to said brake pedal to be operated upon initial movement thereof from normal off position and the other switch being operable independently of said one switch.

12. In a tractor-trailer brake system, brake actuators for the tractor brakes, a brake pedal on the tractor having a normal off position, control means on the tractor connected to said brake pedal and operable for supplying fluid pressure to said actuators, actuators for the trailer brakes, a relay valve on the trailer connected to said trailer brake actuators and having a fluid conduit connected to a source of fluid pressure on the trailer, a service line connected at one end to said control means and at its other end to said relay valve whereby pressure in said service line will operate said relay valve to supply pressure fluid from said source to said trailer brake actuators, an auxiliary valve mechanism connected in said service line and comprising elements connected for operation by said brake pedal and operative upon initial movement of said brake pedal from off position for supplying pressure fluid from said source to said other end of said service line to operate said relay valve and comprising other elements connected to be responsive to pressure in said one end of said service line and operable when pressure in said one end of said service line increases to a predetermined point for closing communication between said source and said other end of said service line and opening communication through said service line, and a second valve mechanism connected in said service line between said auxiliary valve mechanism and said relay valve mechanism, said second valve mechanism comprising a body having a pressure responsive unit therein having a relatively large surface exposed to pressure in said other end of said service line and a surface of relatively small area exposed to said service line between said auxiliary and said second valve mechanisms, said second valve mechanism having a normally open passage for the flow of fluid through said service line, a valve element mechanically connected to said pressure responsive unit and arranged to close said passage upon movement of said pressure responsive unit from a normal position by pressure acting on said relatively large surface, and a selectively operable means for rendering pressure to which said large surface is exposed operative or inoperative for moving said pressure responsive unit from normal position.

13. A system according to claim 12 wherein said selectively operable means comprises an electromagnetic device, and a circuit for said electromagnetic device comprising a pair of switches in series, one of said switches being connected to said brake pedal to be closed upon initial movement of said pedal from said off position, the other switch being operable independently of said one switch.

14. In a tractor-trailer brake system, brake actuators for the tractor brakes, a brake pedal on the tractor having a normal off position, control means on the tractor connected to said brake pedal and operable for supplying fluid pressure to said actuators, actuators for the trailer brakes, a relay valve on the trailer connected to said trailer brake actuators and having a fluid conduit connected to a source of fluid pressure on the trailer, a service line connected at one end to said control means and at its other end to said relay valve whereby pressure in said service line will operate said relay valve to supply pressure fluid from said source to said trailer brake actuators, an auxiliary valve mechanism connected in said service line and comprising elements connected for operation by said brake pedal and operative upon initial movement of said brake pedal from off position for supplying pressure fluid from said source to said other end of said service line to operate said relay valve and comprising other elements connected to be responsive to pressure in said one end of said service line and operable when pressure in said one end of said service line increases to a predetermined point for closing communication between said source and said other end of said service line and opening communication through said service line, and a second valve mechanism connected in said service line between said auxiliary valve mechanism and said relay valve, said second valve mechanism comprising a body having a first chamber and a second chamber communicating respectively with said other end of said service line and with said service line between said auxiliary and said second valve mechanisms, a pressure responsive unit in said body having a larger surface exposed to said first chamber and a smaller surface exposed to said second chamber, said pressure responsive unit having a passage therethrough normally connecting said chambers, a normally open valve arranged adjacent said smaller surface and engageable thereby when said pressure responsive unit moves from a normal position by pressure acting on said larger surface to close communication through said passage, means normally operative for rendering pressure in said second chamber inoperative for moving said pressure responsive unit, and selectively operable means connected to said last-named means for rendering said last-named means inoperative whereby pressure in said second chamber will move said pressure responsive unit to close said normally open valve.

15. A system according to claim 14 wherein said selectively operable means comprises an electromagnetic device and a circuit for said electromagnetic device comprising a pair of switches in series, one switch being connected to said brake pedal to be closed thereby when said brake pedal initially moves from off position and the other switch being operable independently of said one switch.

16. A system according to claim 14 wherein said means normally operative for rendering pressure in said second chamber inoperative for moving said pressure responsive unit comprises a third chamber to which is exposed a surface of said pressure responsive unit opposing said larger surface, and means normally connecting said third chamber to said first chamber, said selectively operable means comprising mechanism for closing said third chamber to said first chamber and opening it to the atmosphere to eliminate pressure in said third chamber opposing pressure in said second chamber.

17. A system according to claim 16 wherein said last-named mechanism comprises passage means communicating with said third chamber, a normally open valve element connecting said passage means to said first chamber, a normally closed valve element closing communication between said passage means and the atmosphere, and means for moving said valve elements to close said normally open valve element and open said normally closed valve element.

18. A system according to claim 16 wherein said last-named mechanism comprises passage means communicating with said third chamber, a normally open valve element connecting said passage means to said first chamber, a normally closed valve element closing communication between said passage means and the atmosphere, a normally de-energized electromagnetic device connected to said valve elements, and a circuit for said electromagnetic device comprising a pair of switches in series, one of which is connected to said brake pedal to be closed upon initial movement thereof from off position and the other of which is normally open and adapted to be closed independently of said one switch.

References Cited in the file of this patent

UNITED STATES PATENTS

| | | |
|---|---|---|
| 2,062,500 | Casler et al. | Dec. 1, 1936 |
| 2,362,931 | Rodway | Nov. 14, 1944 |
| 2,808,902 | Williams | Oct. 8, 1957 |